Aug. 2, 1960  M. W. CONNELL  2,947,315
SINGLE OPERATION NORMALLY CLOSED VALVE
Filed Sept. 4, 1959

INVENTOR.
Maurice W. Connell
BY
Popp and Sommer
Attorneys.

United States Patent Office 2,947,315
Patented Aug. 2, 1960

2,947,315

SINGLE OPERATION NORMALLY CLOSED VALVE

Maurice W. Connell, Clarence Center, N.Y., assignor to Conax Corporation, Buffalo, N.Y., a corporation of New York Filed Sept. 4, 1959, Ser. No. 838,226

5 Claims. (Cl. 137—68)

This invention relates to an improvement in a valve which is normally closed but which can be opened one time to allow the fluid controlled by the valve to be released. This type of valve is herein referred to as a single operation normally closed valve.

More specifically, this invention relates to an improvement in such a valve as described and claimed in my prior Patent 2,815,882 entitled Single Operation Normally Closed Valve.

In practicing the invention of my prior patent it was found that as the size of the valve was increased beyond certain limits, the ram head would not always completely strike out the diaphragm wall separating the inlet and outlet compartments of the valve body, thereby failing to establish the necessary communication between these compartments for proper operation of the valve. Apparently, the ram was not able to compress or displace a sufficient volume of the high pressure incompressible fluid arranged in the inlet compartment in order to permit sufficient penetration of the ram head into the inlet compartment.

Accordingly, it is the principal object of this invention to obviate this difficulty by providing an improved single operation normally closed valve which is so constructed and designed as to permit displacement of a sufficient volume of the aforesaid incompressible fluid in the inlet compartment in order to establish the necessary communication between the inlet and outlet compartments for proper operation of the valve.

A more specific object of the invention is to provide means arranged within the inlet compartment of the valve body and providing an auxiliary compartment for the desired displacement of the incompressible fluid in the inlet compartment.

Another object of the invention is to provide an improved single operation normally closed valve which is adapted to control fluid under high pressure, say in the order of several thousand pounds per square inch, and when closed, effectively seals against the leakage of such pressurized fluid, and which can be quickly opened to permit the unobstructed flow of such fluid through the valve without leakage.

Another object is to provide such an improved single operation normally closed valve which may be operated electrically and therefore may be actuated from a remote point.

Another object is to provide such an improved single operation normally closed valve which requires a very low power input to operate it, such as that derived from a single 1½ volt dry cell battery.

A further object is to provide such an improved single operation normally closed valve which is light in weight and compact in design.

Other objects and advantages of the invention will become apparent upon consideration of the following detailed description and accompanying drawing wherein.

Figure 1:
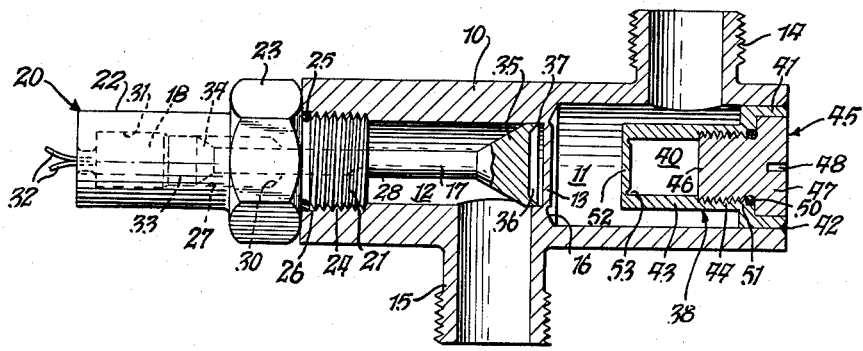
Fig. 1 is a vertical central longitudinal sectional view through an improved electrically operated valve embodying the present invention and showing such valve in its normally closed condition.

Referring to the drawing, there is provided a valve body 10 which is constructed in accordance with the present invention and which is shown as an elongated, substantially rectangular block preferably of a strong, yet light weight metal such as stainless steel. The elongated valve body 10 is shown as being internally formed to provide an inlet compartment 11 and an outlet compartment 12, these compartments being separated by a relatively thin wall or diaphragm 13, preferably formed integrally with the valve body. The inlet compartment 11 communicates with an inlet 14 opening into this compartment and the outlet compartment communicates with an outlet 15. The inlet 14 and outlet 15 are shown as externally threaded projections extending outwardly from the valve body and opening into the respective compartment and are adapted to attachingly receive the ends of suitable internally threaded fittings (not shown) for conducting the fluid being controlled by the valve.

The compartments 11 and 12 are preferably formed by drilling coaxially into the valve body 10 from opposite ends thereof so as to leave the integral wall or diaphragm 13 standing as a partition between these compartments. The compartments 11 and 12 are cylindrical in cross-section and the diameter of the inlet compartment 11 is shown as being considerably larger than that for the outlet compartment. Although this size relationship is not essential, it permits an annular flow passage of substantially constant cross-sectional area to be provided around the ram, to be described below, and thereby achieve substantially uniform flow from the inlet compartment to the outlet compartment when the valve has been opened. A tapered section 16 to the immediate right of the diaphragm 13 serves as a reducing transition from the larger diameter of the inlet compartment 11 to the smaller diameter of the outlet compartment 12.

Electrically operated or excited means are provided for punching out the diaphragm or wall when it is desired to open the valve by establishing communication between the inlet and outlet compartments 11 and 12, respectively. Such means comprises a ram 17 and an electrically ignitable primer 18 arranged within a ram cylinder 20. The ram cylinder 20 is shown as having at its inner end an axially projecting externally threaded reduced extension or neck 21 and at its outer end an axially projecting reduced extension or cap 22, thus leaving an enlarged intermediate part 23. The threaded inner neck 21 screws into the internally threaded outer portion 24 of the bore which forms the outlet compartment 12 and serves as a plug therefor. Leakage past the threaded connection so provided is prevented by an annular sealing ring 25 such as a neoprene or Teflon O-ring which surrounds the neck 21 at the base thereof and is clamped against a shoulder 26 formed at the mouth of the threaded portion 21 of the valve body. The peripheral surface of the enlarged intermediate part 23 of the ram cylinder 20 is preferably out of round so as to permit the application of a wrench (not shown) thereto for tightening the cylinder against the valve body.

The ram cylinder 20 is provided with a bore 27 extending axially completely therethrough and arranged centrally of the inner neck and outer cap 21 and 22, respectively. The inner end of the bore 27 is of reduced diameter as indicated at 28 so as to closely engage the periphery of the ram 17, a tapered portion 30 of relatively short axial extent joining the main cylindrical portion of the bore 27 with its reduced inner cylindrical portion 28. The outer end portion of the bore 27 is slightly enlarged as indicated at 31 to provide a chamber in which the primer 18 is arranged. This primer 18 is of known construction and is in the form of a metal cartridge case containing a charge of combustible propellant ignited by a very small electric input supplied through wires 32, 32. These wires may be in a circuit including a remote source of electrical energy such as a single 1½ volt dry cell battery (not shown).

Turning now to a consideration of the ram 17, the same is in the form of an elongated spindle extending through and engaging the contracted portion 28 of the bore of the ram cylinder and has an enlarged cylindrical piston head 33 at its rear end which has a press fit in the cylindrical bore 27 of the ram cylinder. This head 33 is integrally joined to the spindle portion of the ram by a frusto-conical section 34 having a relatively long axial extent and specifically has an angle of taper with respect to the longitudinal axis of the ram less than that for the taper 30 adjacent the inner end of the bore 27 in the ram cylinder 20. The advantage of such difference in taper is that when these two tapered surfaces engage upon firing the primer an effective seal is provided as will be later described herein.

Figure 2:
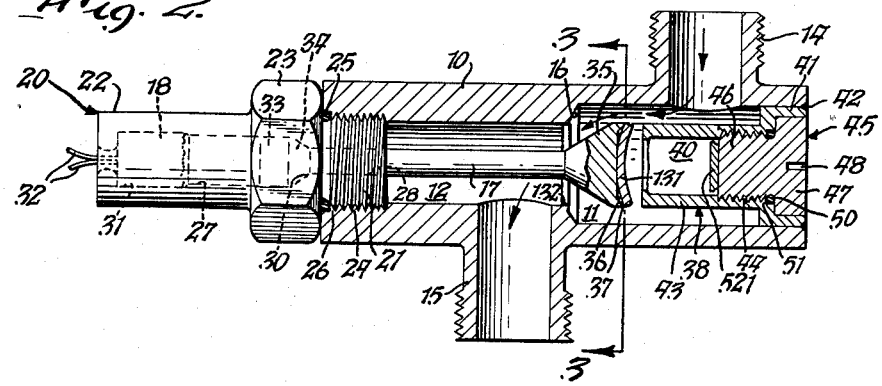
Fig. 2 is a similar view but showing the condition of the valve after being opened.
Figure 3:
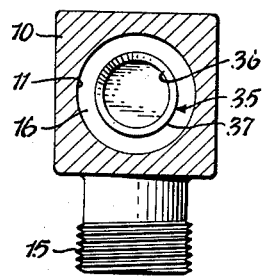
Fig. 3 is a sectional view taken on line 3—3 of Fig. 2.

The front end of the spindle portion of the ram 17 carries an enlarged punching head 35, the leading side of which is shown as having a frusto-conical recess 36 so as to leave a sharp annular axially projecting knife edge 37. The knife edge 37 is adapted to forcefully engage the wall or diaphragm 13 so as to punch out and carry a slug 131 as depicted in Fig. 2.

From the foregoing, it will be seen that the valve is so far constructed substantially in accordance with the teachings of my prior patent. However, in following the teachings of the present invention, the valve is provided with means such as hollow plug 38 which is arranged within the inlet compartment 11 and which provides an auxiliary compartment 40, the purpose of which will be later described in detail herein.

Plug 38, which is preferably made of stainless steel, includes an enlarged cup-shaped portion 41 which is welded to valve body 10 at 42 and an elongated tubular portion 43 which extends freely into inlet compartment 11 toward diaphragm 13 but spaced therefrom and in substantial axial alinement therewith. The internally threaded outer or rear end 44 of tubular portion 43 is closed by a solid plug 45 preferably constructed of stainless steel also and having a reduced externally threaded portion or neck 46 screwed into end 44 and an enlarged head portion 47 provided with the usual slot 48 for the reception of a tool (not shown). Just as with the threaded connection between neck 21 and bore 24, leakage past the present threaded connection is prevented by an annular sealing ring 50 such as a neoprene or Teflon O-ring which surrounds the neck 46 at the base thereof and is clamped against a shoulder 51 formed at the mouth of the threaded end 44 of tubular portion 43.

At its other or inner end, adjacent and directly opposite diaphragm 13, tubular portion 43 is shown as being provided with a diaphragm or wall 52 having a smaller diameter than diaphragm 13 and preferably formed integral with the tubular portion. However, this does not imply any essential diametral relationship between the two diaphragms, it being understood that the exposed area of diaphragm 52 may be varied as desired within practical limits, and is merely one factor in determining its rupturability. In the particular design illustrated, diaphragm 52 is provided with an annular recess or weakened portion 53 to facilitate rupture thereof as will be described below.

It will now be seen that a valve constructed in accordance with the present invention is normally closed. That is, the integral wall or diaphragm 13 separates the inlet and outlet compartments 11 and 12, respectively, while the diaphragm 52 separates the inlet and auxiliary compartments 11 and 40, respectively. Both of these diaphragms are designed so as to have the necessary thickness to prevent being blown out by the pressure of the incompressible fluid in the inlet compartment. The enlarged head 41 of the hollow plug 38 and the solid plug 45 suitably seal the outer end of inlet compartment 11 and, of course, the fitting (not shown) which screws over the inlet projection 14 provides a suitable seal against the leakage of this pressurized fluid which in some applications of the valve might have a pressure of 4,000 p.s.i. or even higher.

In the unfired condition of the valve as shown in Fig. 1, no part of the ram 17 is arranged in the inlet compartment 11 and it is important to note that the knife edge 37 of the ram punching head 35 is spaced slightly away from the opposing face of the wall or diaphragm 13. The purpose of this is that when the primer 18 is ignited by passing a small current through the wires 32, the pressurized gases resulting from combustion of the propellant can be fully utilized to overcome the static friction of the ram piston head 33 which, as previously stated, has a press fit in the bore 27 of the ram cylinder, before the knife edge 37 contacts the wall or diaphragm 13. When the ram is moving, the friction between its piston head and the bore 27 is sliding friction which is easier to overcome than its initial static friction.

As the ram is forcefully driven into the inlet compartment 11 the knife edge 37 of its punching head 35 strikes the wall or diaphragm 13 with such a great impact acting over such a small annular area that this edge penetrates the wall or diaphragm, cuts out and carries the slug 131 as shown in Fig. 2. Inasmuch as the inlet compartment 11 is completely filled with and confines an incompressible fluid, which is defined herein as a liquid or a gas under such high pressure that further compression or displacement by the force of the ram is practically impossible, it will be seen that difficulties will be encountered even though the central portion of the slug is pushed or dished outwardly and wedged into the cavity or recess 36 provided in the leading face of the punching head 35. The reason for this is that the ram head acts as a plunger filling the opening formerly occupied by the now sheared out slug. Thus, inasmuch as the ram cannot compress or displace the fluid in the inlet compartment and there is insufficient clearance past the ram head for fluid to flow from the inlet compartment to the outlet compartment, the ram must stop. This is particularly true when the size of the valve exceeds certain limits and when the pressure of the incompressible fluid in the inlet compartment 11 is high. As a consequence, the shearing force of the knife edge 37 of the ram punching head 35, even though it acts independently of the pressure on the inlet side of the valve, is not sufficient by itself to always completely cut out the slug 131 and thus fails to establish the necessary communication between the inlet and outlet compartments 11 and 12, respectively, for proper operation of the valve.

Accordingly, in order to obviate this difficulty, the hollow plug 38 and its detailed components providing the auxiliary compartment 40 are employed. Thus, as the ram 17 moves forwardly into forceful contact with the wall or diaphragm 13, either a sudden increase in pressure or a shock wave generated causes the diaphragm 52 to be sheared out to form the slug 521, upon the diaphragm 13 being struck out. This permits displacement of a sufficient volume of the incompressible fluid from the inlet compartment 11 into the auxiliary compartment 40. Even though this auxiliary compartment has been previously filled with and confines a quantity of compressible fluid, which is defined herein as including any suitable gas at a substantially lower pressure than that in the inlet compartment 11, the preferred medium employed being air at atmospheric presure, the incompressible fluid readily flows into auxiliary compartment 40 because of the substantial pressure differential.

This displacement of the high pressure, incompressible fluid in the inlet compartment 11 permits the ram 17 to completely strike out the slug 131 from diaphragm 13 and to enter the inlet compartment a sufficient distance to permit the desired communication between the inlet and outlet compartments 11 and 12, the removal of slug 131 leaving a hole 132 (Fig. 2) which is larger in diameter than the spindle portion of the ram 17, thereby establishing an annular passage through which fluid flows from the inlet compartment 11 into the outlet compartment 12 and thence out through the outlet 15. As also seen in Fig. 2, the ram punching head 35 carries the dished slug 131, while slug 521 is forced into the auxiliary compartment 40 and lies adjacent the inner or free end of the reduced threaded portion or neck 46 of solid plug 45.

Upon establishment of the desired communication between inlet and outlet compartments 11 and 12, as well as between inlet compartment 11 and auxiliary compartment 40, the fluid flows in the direction of the arrows as indicated in Fig. 2, and any leakage out of the outlet compartment 12 around the spindle of ram 17 is prevented by the seating of the tapered portion 34 on the tapered inner face 30 of the end wall of the ram cylinder 20 with such force that these engaging tapered surfaces are mutually upset and welded together as shown in Fig. 2. This provides an effective seal against the leakage of fluid at this place from the outlet compartment 12 and the pressure of the fluid flowing into this compartment will not retract the ram. The ram and ram cylinder are also preferably constructed of stainless steel.

Thus, the present invention provides an improved single operation normally closed valve which operates properly regardless of the size of the valve and which is effectively sealed when either closed or opened. The valve has application where fast response, light weight, compact design and low input power are prime factors.

What is claimed is:

1. In a single operation normally closed valve including a valve body having an inlet compartment adapted to be filled with and to confine incompressible fluid therein, an outlet compartment, a first diaphragm separating said compartments and ram means arranged on the outlet compartment side of said first diaphragm and including an enlarged head, the combination therewith comprising means providing an auxiliary compartment adapted to be filled with and to confine compressible fluid therein and having a second diaphragm closing one end thereof and exposed to the interior of said inlet compartment, said ram means when actuated driving said head through said first diaphragm to strike out a one-piece portion thereof and said head moving into said inlet compartment sufficient to permit fluid flow therepast and thereby establish communication between said compartments, and said second diaphragm being rupturable upon said first diaphragm being struck out, whereby communication is established with the interior of said auxiliary compartment to permit displacement of said incompressible fluid into said auxiliary compartment.

2. In a single operation normally closed valve including a valve body having an inlet compartment adapted to be filled with and to confine incompressible fluid therein, an outlet compartment, a first diaphragm separating said compartments, and ram means arranged on the outlet compartment side of said first diaphragm and including an enlarged head, the combination therewith comprising hollow plug means arranged within said inlet compartment and providing an auxiliary compartment adapted to be filled with and to confine compressible fluid therein, and a second diaphragm closing one end of said plug means adjacent said first diaphragm, said ram means when actuated driving said head through said first diaphragm to strike out and carry a one-piece portion thereof and said head moving into said inlet compartment sufficient to permit fluid flow therepast and thereby establish communication between said compartments, and said second diaphragm being rupturable to form a one-piece portion upon said first diaphragm being struck out, whereby communication is established with the interior of said auxiliary compartment to permit entry of said incompressible fluid.

3. In a single operation normally closed valve including a valve body having an inlet compartment adapted to be filled with and to confine incompressible fluid therein, an outlet compartment, a first diaphragm separating said compartments, and ram means arranged on the outlet compartment side of said first diaphragm and including an enlarged head, the combination therewith comprising a hollow plug arranged within said inlet compartment and providing an auxiliary compartment adapted to be filled with and to confine compressible fluid therein, means closing one end of said hollow plug remote from said first diaphragm, and a second diaphragm closing the other end of said hollow plug adjacent and directly opposite said first diaphragm, said ram means when actuated driving said head through said first diaphragm to strike out and carry a one-piece portion thereof and said head moving into said inlet compartment sufficient to permit fluid flow therepast and thereby establish communication between said compartments, and said second diaphragm being rupturable to form a one-piece portion upon said first diaphragm being struck out, whereby communication is established with the interior of said auxiliary compartment to permit entry of said incompressible fluid.

4. In a single operation normally closed valve including a valve body having an inlet compartment adapted to be filled with and to confine incompressible fluid therein, an outlet compartment, a first diaphragm separating said compartments, and ram means arranged on the outlet compartment side of said first diaphragm and including an enlarged head, the combination therewith comprising an elongated hollow plug arranged within said inlet compartment and providing an auxiliary compartment adapted to be filled with and to confine compressible fluid therein, said plug having an enlarged head portion closing the end of said inlet compartment remote from said first diaphragm and an elongated tubular portion extending freely into said inlet compartment toward said first diaphragm in spaced relation thereto and in substantial axial alinement therewith, means closing one end of said tubular portion adjacent said enlarged head portion, and a second diaphragm closing the other end of said tubular portion adjacent and directly opposite said first diaphragm, said ram means when actuated driving said head through said first diaphragm to strike out and carry a one-piece portion thereof and said head moving into said inlet compartment sufficient to permit fluid flow therepast and thereby establish communication between said compartments, and said second diaphragm being rupturable to form a one-piece portion upon said first diaphragm being struck out, whereby communication is established with the interior of said auxiliary compartment to permit entry of said incompressible fluid.

5. In a single operation normally closed valve including a valve body having an inlet compartment adapted to be filled with and confine incompressible fluid therein, an outlet compartment, a rupturable diaphragm separating said compartments and ram means arranged on the outlet side of said diaphragm, the combination therewith comprising deformable means exposed to the interior of said inlet compartment and providing an auxiliary compartment containing compressible fluid, said ram means when actuated moving toward said inlet compartment and rupturing said diaphragm to establish communication between said compartments, and said means being deformed upon said diaphragm being ruptured to reduce the volume of the compressible fluid within said auxiliary compartment and thereby permit displacement of said incompressible fluid.

No references cited.